April 15, 1952     E. G. BOWEN ET AL     2,592,855
RADIO LOCATING APPARATUS
Filed Dec. 21, 1943
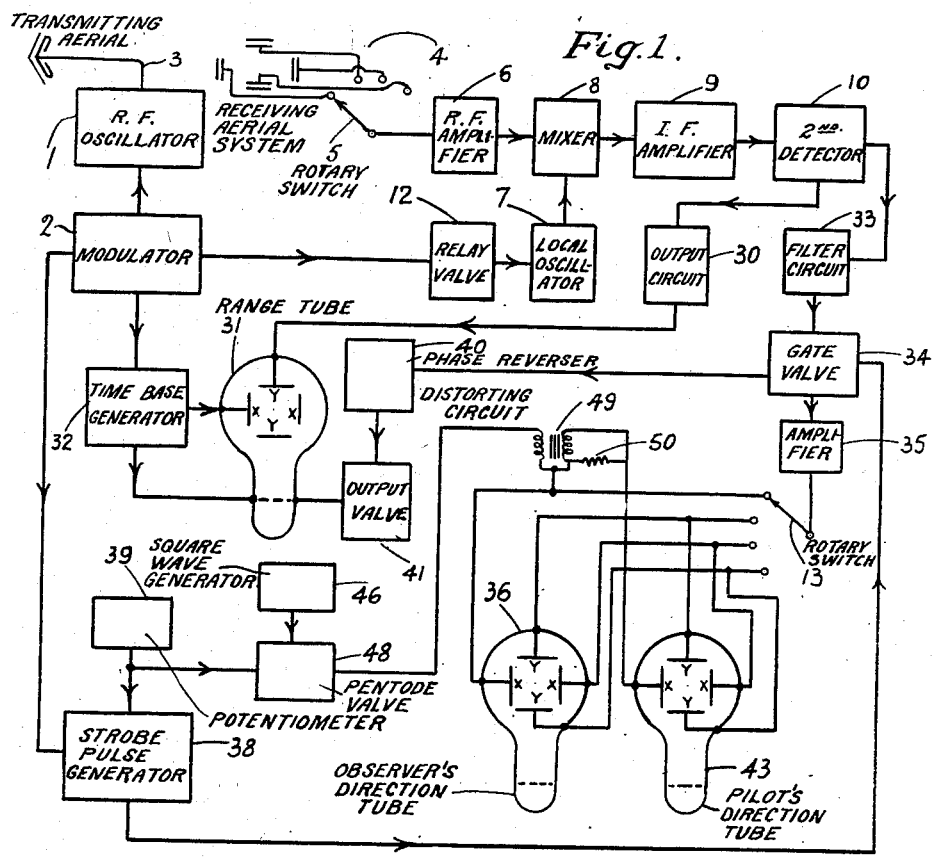
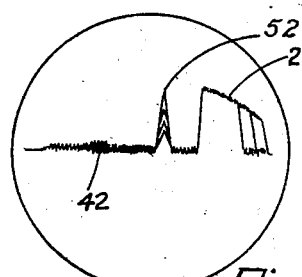
Fig.2A.
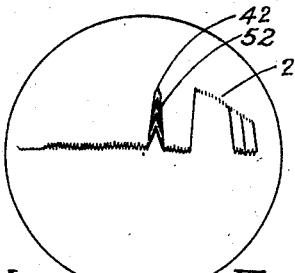
Fig.2C.
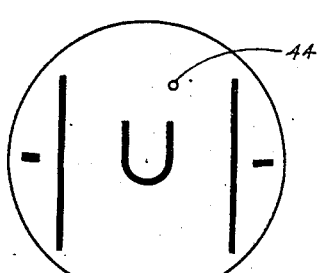
Fig.2E.
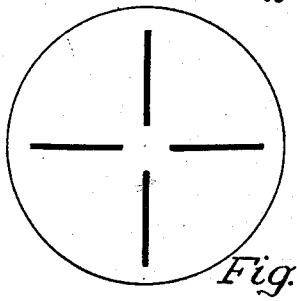
Fig.2B.
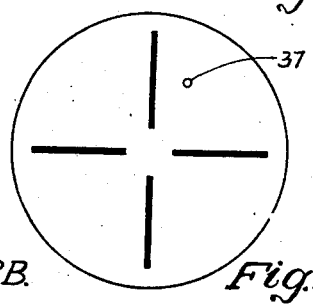
Fig.2D.
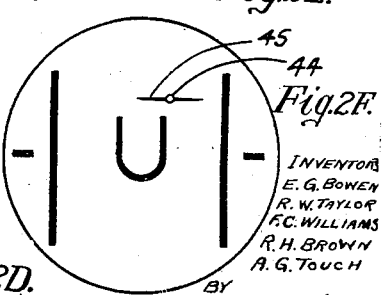
Fig.2F.
INVENTORS
E. G. BOWEN
R. W. TAYLOR
F. C. WILLIAMS
R. H. BROWN
A. G. TOUCH
BY Loyd Hall Sutton
Attorney Patented Apr. 15, 1952

2,592,855

UNITED STATES PATENT OFFICE 2,592,855

RADIO LOCATING APPARATUS

Edward George Bowen, Cambridge, Mass., and Ronald William Taylor, Malvern, Frederick Calland Williams and Robert Hanbury Brown, Great Malvern, and Arthur Gerald Touch, Farnborough, England, assignors to Minister of Supply in His Majesty's Government of Great Britain and Northern Ireland, London, England Application December 21, 1943, Serial No. 515,119½. In Great Britain December 25, 1942

6 Claims. (Cl. 343—11)

The present invention relates to radio installations for indicating the presence and location of distant bodies.

It is well known that a body within the field of a radio transmitter will reflect waves back along the path of incidence and that the time interval between the outgoing wave and the return of the corresponding reflected wave or echo is a measure of the distance of the body from the transmitter. If the reflected wave is picked up on an aerial system having suitable directional properties the angle of bearing or elevation of the distant body can also be ascertained.

It is an object of the present invention to provide a self-contained apparatus of this nature suitable for installation in an aircraft for example, in order to enable a pilot, when flying under conditions of poor visibility, to ascertain his distance from reflecting bodies, such as other aircraft, within the range of his transmitter, together with their position in azimuth and elevation relative to his line of flight.

According to the present invention a radio locating apparatus mounted in a mobile vehicle such as an aircraft comprises a transmitter adapted to radiate a pulse-modulated exploring beam over a wide solid angle in a forward direction, and a directional receiver for picking up the echo signals produced by reflection of the exploring pulses, means for changing cyclically the direction of maximum response of the receiving aerial system so that it occupies in turn the four cardinal positions in which it is inclined directly above and below and to the left and right of the line of flight of the aircraft, and means for presenting the echo signals on cathode ray tube indicating apparatus against a time base which is synchronised with the repetition frequency of the exploring pulses in order to indicate the range and relative direction of the object giving rise to the echo signals.

The receiving aerial system preferably comprises four directional aerials, such as active dipoles with associated director dipoles, two of the aerials being disposed one on each side of and at equal distances from the nose of the aircraft and constituting an azimuth finding pair whilst the two remaining aerials are disposed at equal distances above and below a wing to constitute an elevation finding pair, switching means being provided for feeding the outputs from the four aerials in sequence to a signal receiver and for synchronously switching the output of the signal receiver to separate deflecting plates of the cathode ray tube indicating apparatus.

The latter may comprise two cathode ray oscillographs for indicating azimuth and elevation respectively, the former having a vertical time base and the latter a synchronous horizontal time base, the output voltages derived from the signals from the azimuth finding aerials being switched to the horizontal deflecting means of the azimuth tube and those derived from the elevation indicating aerials being switched to the vertical deflecting means of the elevation tube.

Preferably, echo-signal voltages are presented against a horizontal time-base on one cathode ray tube for the purpose of indicating the range of the object giving rise to the echo, and are distributed by means of a rotary switch to the four deflecting plates of a direction indicating tube in such a way that signal voltages derived from the azimuth aerials are applied to the horizontal deflecting plates and those from the elevation aerials to the vertical deflecting plates, whereby the position of the spot on the tube screen will indicate the direction of the object in both azimuth and elevation. A second direction-indicating tube connected in parallel with the first can be provided for giving a direct indication to the pilot or for any other purpose.

In the preferred arrangement, means may be provided for developing signal-selecting pulses, hereinafter referred to as "strobing" pulses, which have a frequency equal to that of the exploring pulses but a timing in relation to the exploring pulses which is adjustable at will, and which are utilized to control the application of the echo-signal voltages to the direction-indicating tube in such a way that these voltages are only applied when the timing of the signal selecting pulse has been adjusted so that they coincide with the echo-signals from a selected target. This coincidence is achieved by applying the signal selecting pulses to the control grid of the range indicating tube to brighten a portion of the trace on the screen of that tube, and by adjusting their timing until the brightened portion overlaps the echo-trace produced by signals from the selected object.

Preferably the adjustment of the timing of the strobing pulses also controls the magnitude of voltage impulses which are applied to the horizontal plates of the pilot's direction-indicating tube for the purpose of giving an approximate indication of the range of the selected object on the screen of that tube.

Provision is also made for adapting the equipment to enable it to be used for homing on to a distant beacon station.

In order that the invention may be more clearly understood and readily carried into effect, preferred embodiments of the invention which are particularly intended for use in fighter aircraft for aiding in the interception of enemy aircraft will now be described by way of example with reference to the accompanying drawings in which:

Fig. 1 is a block diagram of one form of the invention in which one tube indicates the range, and the second tube indicates both azimuth and elevation; and Figs. 2 (A–F) illustrate typical indications on the screens of the tubes.

Referring to Fig. 1 a radio frequency oscillator 1 is excited by a master control relay or modulator 2 to produce a pulse-modulated exploring signal, the duration of each pulse being approximately 2.8 microseconds and the pulses being repeated at intervals of about 1500 microseconds. The exploring signal is radiated by an aerial 3 which, in practice, comprises a folded doublet and an associated director, both of which are mounted in the nose of the aircraft with their limbs sloped backwards, to give maximum radiation in front of the aircraft and as little as possible to the rear.

The relay 2 comprises any suitable type of pulse generator. This pulse generator applies a positive pulse having a duration of approximately 2.8 microseconds to the anodes of the oscillator valves and also applies a positive pulse to the grids of the oscillator valves, the second pulse being delayed by 2.8 microseconds with respect to the first pulse. The positive pulse on the anodes is followed by a negative pulse which in conjunction with the delayed positive pulse applied to the grids serves to damp out the end of the pulse.

The oscillator 1 comprises a pair of push-pull valves which are capable of developing a high level of peaked power. The two anodes are connected by a Lecher circuit which is tuned by a sliding bridge and is connected through an inductance and series resistance to the output of the relay 2, and is coupled through sliding condensers to the transmitting aerial 3. None of the valve electrodes are directly earthed, the cathodes being connected to earth through tuned circuits which act as phasing reactances, whilst the grids are similarly tuned by the inductance of the leads. Both grids are coupled through a choke to a tapping on the output circuit of the relay 2.

The oscillator valves are active for the duration of the 2.8 microsecond pulse applied to the push-pull oscillator valves. When this ceases, the resulting drop in anode voltage is accentuated by the negative bias applied to the anodes of the push-pull valves whilst the positive voltage applied to the grids ensures the sharp termination of the signalling pulse. It is to be noted that any tailing-off of the pulse tends to limit close-range observation.

The reflected echoes are received on an aerial system 4 comprising two separate pairs of aerials, one pair being directive in azimuth and the other in elevation. The elevation aerials each comprise an active dipole with an associated director dipole and are mounted above and below one of the wings of the aircraft. They are inclined slightly to the rear so that their lobes of maximum sensitivity extend forward above and below but with an equal overlap along the plane of the wing; they therefore develop signal voltages of equal strength from an echo from any target that is located in that plane, but respond unequally to targets located above or below it. The azimuth aerials are similar to the elevation aerials and are mounted one on each wing at equal distances from the fore-and-aft axis of the aircraft; they respond equally to the echo from any target that is located along the forward line of flight but unequally to that from any target to the port or starboard of it.

A rotary switch 5 feeds the signals from each aerial separately and in rapid succession to a common signal receiver comprising a radio-frequency amplifier 6, local oscillator 7, mixer 8, intermediate frequency amplifier 9, and second detector 10. In order to protect the receiving circuits from the direct impact of the transmitter signal, the local oscillator 7 is periodically disabled by the priming impulse from the relay 2 which is applied to trigger the grid of a gas filled valve 12, causing the latter to short-circuit the high tension supply to the local oscillator for a period of time which is sufficient to shut out the greater part of the transmitted signal.

A portion of the output of the second detector 10 is fed through a circuit 30 to the Y-plates of the range indicating tube 31. The circuit 30 comprises a pentode amplifier and a double diode valve which serves as a voltage regulator, one diode being shunted across a resistance in the grid circuit of the amplifier to maintain the grid at a contant datum potential for signals of varying strength, and the other diode being shunted across the Y-plates of the tube 31 to prevent any undesirable vertical shift. The X-plates of the tube 31 are fed with a time-base voltage from a generator 32 which is synchronised by the priming impulses from the relay 2. The generator 32 comprises a screen grid valve, the priming impulse being applied to the control grid to render the valve conducting, thus allowing a condenser connected across it to discharge. The condenser then recharges through a resistance and the exponential rising voltage is applied through a condenser to one of the X-plates of the tube 31. A correcting voltage from the screening grid of the valve is applied through two condensers in series to the control grid of the tube 31 and serves, in conjunction with the usual brightness and focussing controls to maintain the brightness of the trace constant throughout its length. A typical screen indication is shown in Fig. 2(A), the position of the echo-trace 52 along the horizontal time base serving to indicate the range of the target.

Another portion of the output from the second detector 10 is fed to a circuit 33 which includes a filter and a valve, the filter serving to eliminate certain forms of interference before the signals are applied to the grid of the valve. This valve is arranged to give a logarithmic output and is coupled to the suppressor grid of a dual-control "gate" valve 34 having signal selecting pulses, hereinafter referred to as "strobing" pulses, applied to its control grid. These strobing pulses have a periodicity equal to that of the exploring pulses and hence to that of the received echo signals, and the various potentials on the electrodes of the valve 34 are so chosen that the valve is only conductive when the strobing pulses and the echo signals applied to it are in step. When this is achieved, the output will consist of a series of pulses the amplitude of which vary in accordance with the amplitude of the echo signals. This output is amplified at 35 and delivered to each of the deflecting plates of the direction finding tube 36 in turn by means of the synchronous switch 13. Voltages corresponding to the signal amplitudes picked up on the azimuth aerials are fed to the two horizontal plates whilst those corresponding to the amplitudes picked up on the elevation aerials are fed to the two vertical plates. The plates are shunted to earth through condensers which serve to "average" the voltage applied to each plate over the period between its application and the application of the next voltage by the switch 13. The vertical deflection of the spot is thus determined by the difference between the signal voltages from the two elevation aerials whilst the horizontal deflection is similarly fixed by the difference between the signal voltages from the two azimuth aerials. A typical screen indication is shown in Fig. 2(D) in which the position of the spot 37 indicates that the target is above and to the right of the observer.

The strobing pulses are generated by a circuit 38 which comprises a pentode valve having its anode circuit connected to the grid of one of a pair of cross coupled valves acting as a multivibrator. Priming impulses from the relay 2, which are delayed slightly so that their leading edge coincides with the exploring pulse, are applied through a resistance-capacity network to the control grid of the pentode valve to trigger it. For a short period equal to the duration of the priming impulse the anode voltage drops sharply by an amount determined by the cathode potential of the pentode; thereafter it rises exponentially at a rate determined by the value of the resistance in the resistance-capacity networks connected in the anode and screen-grid circuits of the pentode. When the anode voltage reaches a certain level it triggers the multivibrator, and a sharp pulse appears in the output circuit of the second valve of the multivibrator. This shock excites a tuned circuit the output of which is fed through a condenser to the control grid of the "gate" valve 34. This output clearly will consist of a series of pulses having a recurrence frequency equal to that of the exploring pulses. The timing of these strobing pulses in relation to the exploring pulses will depend upon the cathode potential of the pentode, since this potential determines the level from which the anode voltage begins to rise and hence the time it takes to reach the triggering level. The cathode potential is variable by means of a potentiometer 39 and hence the timing of the strobing pulses can be varied at will by adjusting this potentiometer.

In addition to controlling the "gate" valve 34 as already described the strobing pulses are fed to the control grid of the range tube 31 from the screening grid of the valve 34 (where they appear as negative pulses) through valves 40, 41. Here, their effect is to brighten a small portion of the trace on the screen of the tube, the position of the brightened portion obviously depending upon the timing of the pulses. When they are in step with the received echo signals then the brightened portion of the trace will be the echo trace itself. This is illustrated in Figs. 2(A) and 2(B). In Fig. 2(A) the brightened portion 42 does not coincide with the echo trace 52; consequently the strobing pulses are out of step with the echo signal giving rise to the echo trace 52 and therefore no signal voltages are passed to the plates of the direction finding tube 36. This tube is then switched off as indicated in Fig. 2(B). In Fig. 2(C) the potentiometer 39 has been adjusted to make the brightened portion 42 coincide with the echo 52; the strobing pulses are now in step with the echo signals, and signal voltages are passed by the gate valve 34 to the plates of the tube 36 which is now switched on. Consequently it is ensured that the target indicated on the direction-finding tube 36 is the same as that selected on the range tube by the strobing control potentiometer 39, and hence that the observations made on both tubes do in fact refer to the same target.

In practice, the observer watches the screens of tubes 31 and 36 and directs the pilot until the target is in approximate range. He then switches on the pilot's tube 43 which is connected in parallel with the tube 36 and repeats the indication given on that tube, and the pilot can then manoeuvre the aircraft in accordance with the direct indication given on his tube.

In addition to repeating the indication given on the tube 36, the pilot's tube 43 indicates also the approximate range of the target. For this purpose means are provided for developing voltage pulses of a magnitude proportional to the range of the target and applying them to the horizontal deflecting plates so that the spot is elongated or "grows wings," the length of which indicates the approximate range. This is illustrated in Figs. 2(E) and 2(F). Fig. 2(E) shows the screen of the pilot's tube indicating a target at 44 which is at a range greater than, say, 7500 feet; it is merely repeating the indication given by the tube 36. In Fig. 2(F) the target range has decreased and the spot 44 has grown wings 45; when the range has decreased to 2500 feet the wings fill the U, and when it has decreased to 1000 feet they span the two vertical lines.

The "wing producing" voltage is derived as follows: A valve 46 is adapted to generate square-topped impulses which are passed to the suppressor grid of a pentode valve 48. This valve is normally biassed to cut-off, but has the voltage selected by the strobing potentiometer 39 applied to its control-grid and will pass the square-topped impulses at an amplitude depending on this voltage. Clearly the amplitude of these impulses is determined by the setting of the potentiometer 39 and if this setting is adjusted to maintain the brightened portion 42 of the trace in coincidence with the echo-trace 52 on the range tube, this amplitude will increase with decrease in range. These impulses are applied via the transformer 49 and resistance 50 to the X-plates of the tube 43, each impulse developing two sharp impulses of opposite polarity across secondary winding of the transformer 49, which impulses deflect the spot equally in both directions to produce the wings.

We claim:
1. Radio-locating apparatus for a mobile vehicle such as an aircraft, comprising a transmitter for radiating a pulse-modulated exploring beam, a receiving aerial system for picking up echo signals produced by reflection of the exploring pulses from a distant body, said aerial system consisting of a plurality of directional aerial arrays, arranged at four cardinal positions about the line of movement of the vehicle, a receiver, first switching means for connecting each of said aerial arrays in turn to said receiver, cathode ray tube indicating apparatus consisting of at least two cathode ray tubes, time base generating means synchronized with said transmitter for providing a linear time base for a first cathode ray tube, means for applying the output of the receiver to said first cathode ray tube to provide an indication of the range of the distant body by deflection of the linear time base trace, second switching means operated in synchronism with said first switching means for applying the echo signals derived from each of said aerial arrays in turn to the deflecting means of said second cathode ray tube to provide an indication of the bearing of said distant body in both azimuth and elevation.

2. Radio-locating apparatus for a mobile vehicle such as an aircraft, comprising a transmitter for radiating a pulse-modulated exploring beam, a receiving aerial system for picking up echo signals produced by reflection of the exploring pulses from a distant body, said aerial system consisting of a plurality of directional aerial arrays arranged to the left and right of the line of movement of the vehicle to constitute an azimuth-determining pair and above and below the line of movement of the vehicle to constitute an elevation-determining pair, a receiver, first switching means for connecting each of said aerial arrays in turn to said receiver, first and second cathode ray tubes, time base generating means synchronised with said transmitter for providing a linear time base for said first cathode ray tube, means for applying the output of said receiver to said first cathode ray tube to provide an indication of the range of the distant body of deflection of the linear time base trace and second switching means operated in synchronism with said first switching means for applying in turn the echo signals derived from the azimuth-determining pair of arrays to the horizontal deflecting means of said second cathode ray tube and the echo signals derived from the elevation-determining pair of arrays to the vertical deflecting means of said second cathode ray tube so that the spot on the screen of said second tube takes up a position indicative of the relative direction of said distant body.

3. Radio-locating apparatus for a mobile vehicle such as an aircraft comprising a transmitter for radiating a pulse-modulated exploring beam, a receiving aerial system for picking up echo signals produced by reflection of the exploring pulses by a distant body, said aerial system consisting of a plurality of aerial arrays arranged in the four cardinal positions about the line of movement of said vehicle, a receiver, first switching means for connecting each of said aerial arrays in turn to said receiver, a cathode ray tube having a luminescent screen, focussing means for concentrating the electron stream of said cathode ray tube to give a spot indication on said cathode ray tube, second switching means for connecting the output of said receiver in turn to the deflecting means of said cathode ray tube to cause said spot to take up a position indicative of the bearing in elevation and azimuth of the distant body, means operating independently of the received echo signal for developing a control voltage of a magnitude varying with the distance of said distant body and means for applying said control voltage to said cathode ray tube to modify said spot in accordance with variations in said distance.

4. Radio-locating apparatus for a mobile vehicle such as an aircraft comprising a transmitter for radiating a pulse-modulated exploring beam, a receiver for picking up echo signals produced by reflection of the exploring pulses by a distant body, a cathode ray tube having a luminescent screen, means for applying the output of said receiver to the deflecting means of said cathode ray tube to cause a spot indication to be given on said screen of the bearing in elevation and azimuth of the distant body, means operating independently of the received echo signals for developing a control voltage of a magnitude varying with the distance of said distant body, means for applying said control voltage to said cathode ray tube to cause said spot indication to be elongated laterally to an extent dependent upon the distance of said distant body and a mask for the screen of said cathode ray tube provided with markings related to selected distances to facilitate the observation of said distant body.

5. Radio-locating apparatus for a mobile vehicle such as an aircraft comprising a transmitter for radiating a pulse-modulated exploring beam, a receiver for picking up echo signals produced by reflection of the exploring pulses by a distant body, a cathode ray tube having a luminescent screen, means for applying the output of said receiver to the deflection means of said cathode ray tube to cause a spot indication to be given on said screen of the bearing in elevation and azimuth of the distant body, means for deriving a control voltage of a magnitude varying with the distance of said distant body, means for generating signal-selecting pulses having the same pulse recurrence frequency as the transmitted pulses, the timing of said signal-selecting pulses being varied by said control voltage to coincide with the received echo signals and means for applying said control voltage to the deflecting means of said cathode ray tube to cause said spot indication to be elongated laterally to an extent dependent upon the distance of said distant body.

6. Radio-locating apparatus for a mobile vehicle such as an aircraft comprising a transmitter for radiating a pulse-modulated exploring beam, a receiver for picking up echo signals produced by reflection of the exploring pulses by a distant body, a cathode ray tube having a luminescent screen, means for applying the output of said receiver to the deflection means of said cathode ray tube to cause a spot indication to be given on said screen of the bearing in elevation and azimuth of the distant body, potentiometer means for deriving a control voltage of a magnitude varying with the distance of said distant body, means for generating square waves the amplitude of which is determined by said control voltage, distorting means for producing positive-going and negative-going pulses from said square waves and means for applying said pulses to the deflecting means which control the horizontal displacement of the spot to cause the spot indication to be elongated in the horizontal direction to an extent dependent upon the distance of said distant body.

EDWARD GEORGE BOWEN.
RONALD WILLIAM TAYLOR.
FREDERICK CALLAND WILLIAMS.
ROBERT HANBURY BROWN.
ARTHUR GERALD TOUCH.

(References on following page)

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,412,669 | Bedford | Dec. 17, 1946 |
| 2,412,702 | Wolff | Dec. 17, 1946 |
| 2,412,703 | Wolff | Dec. 17, 1946 |
| 2,416,088 | Deerhake | Feb. 18, 1947 |
| 2,419,205 | Feldman | Apr. 22, 1947 |
| 2,419,239 | White | Apr. 22, 1947 |
| 2,419,567 | Labin | Apr. 29, 1947 |
| 2,423,104 | Labin | July 1, 1947 |
| 2,424,984 | Hoffman | Aug. 5, 1947 |
| 2,426,182 | De Lange | Aug. 26, 1947 |
| 2,426,654 | White | Sept. 2, 1947 |
| 2,427,905 | Fyler | Sept. 23, 1947 |
| 2,500,552 | Lindenblad | Mar. 14, 1950 |
| 2,508,358 | Ayres | May 23, 1950 |
| 2,514,828 | Ayres | July 11, 1950 |
| 2,542,032 | Isbister | Feb. 20, 1951 |

FOREIGN PATENTS

| Number | Country | Date |
|---|---|---|
| 526,658 | Great Britain | Sept. 23, 1940 |